United States Patent
Rengert et al.

(10) Patent No.: US 7,948,928 B2
(45) Date of Patent: May 24, 2011

(54) CORDLESS TELEPHONE SYSTEM

(75) Inventors: Otmar Rengert, Nürnberg (DE);
Martin Häusler, Ansbach (DE)

(73) Assignee: DSP Group Switzerland AG, Zurich (CH)

( * ) Notice: Subject to any disclaimer, the term of this patent is extended or adjusted under 35 U.S.C. 154(b) by 696 days.

(21) Appl. No.: 10/543,283

(22) PCT Filed: Jan. 20, 2004

(86) PCT No.: PCT/IB2004/000119
§ 371 (c)(1),
(2), (4) Date: Jul. 25, 2005

(87) PCT Pub. No.: WO2004/068829
PCT Pub. Date: Aug. 12, 2004

(65) Prior Publication Data
US 2006/0245387 A1     Nov. 2, 2006

(30) Foreign Application Priority Data

Jan. 28, 2003  (EP) .................................. 03100174

(51) Int. Cl.
*H04J 3/08* (2006.01)

(52) U.S. Cl. .................................... 370/315; 455/426.2
(58) Field of Classification Search .................... None
See application file for complete search history.

(56) References Cited

U.S. PATENT DOCUMENTS

| 6,208,116 | B1 * | 3/2001 | Fischedick | 320/125 |
| 6,587,694 | B1 * | 7/2003 | Mooney et al. | 455/502 |
| 6,650,088 | B1 * | 11/2003 | Webb et al. | 320/115 |

FOREIGN PATENT DOCUMENTS

WO    WO0193459    * 12/2001

* cited by examiner

*Primary Examiner* — Phuoc Doan
(74) *Attorney, Agent, or Firm* — Hogan Lovells US LLP

(57) ABSTRACT

Cordless telephones according to the DECT standard are constantly transmitting a so-called dummy barrier at a certain power level, repetition interval and transmit frequency to apply corrections to the synchronization counters in the portable parts for synchronization to the fixed part. According to the present invention, once timing of the portable part is synchronized to the fixed part, a wired connection is used for applying these small synchronization corrections with respect to the synchronization between the portable part and the fixed part of the DECT telephone system. Advantageously, an emission of electromagnetic energy is thereby reduced significantly.

10 Claims, 3 Drawing Sheets

CORDLESS TELEPHONE SYSTEM

The present invention relates to a telephone system operating in accordance with the DECT standard, a fixed part for a telephone system operating in accordance with the DECT standard, a portable part for a telephone system operating in accordance with the DECT standard, a method of synchronizing a portable part and a fixed part of a DECT telephone system and to a computer program for a DECT telephone system.

In 1991, the European Telecommunications Standards Institute (ETSI) published the most important parts of the DECT (digital enhanced cordless telecommunications) standard. The DECT standard describes a mobile radio system having a fixed part (FP) comprising one or more base stations or radio-fixed parts (RFP). The mobile station of such a telecommunication system is referred to as portable part (PP).

DECT is a synchronous system where the fixed part provides the timing reference, i.e. the portable parts align the timings and counters concerning bits, slot, frame, optional multiframe, and receiver scan sequence (PSCN) to the fixed part timing. This is done during the portable part synchronisation process.

Once an alignment between the fixed part and the portable part is achieved, the portable part maintains its owns counters and adjusts its timing by applying only small corrections based on "receptions" from the fixed part: the detection of the DECT synchronisation word pattern within the fixed part transmission gives the actual timing reference. In the following, the term "synchronisation" refers to these small corrections. In this idle state, the portable part is just listening.

Besides counters and systems information, the fixed part transmission carries other broadcast information that may be needed after the synchronisation process is completed. For example, the fixed part transmission may also carry broadcast information to notify portable parts about incoming calls (e.g. paging information).

Accordingly, for a standard DECT implementation, for example a GAP (generic access profile) compatible device, the above described synchronisation mechanisms necessitate having a permanent radio transmission from the fixed part to all attached portable parts which are listening. Thus, even if there is no speech transmission between a fixed part and the portable parts, the radio link between the fixed part and the portable parts is frequented with synchronisation signals (the so-called "dummy bearer"), such that there is basically a constant radio transmission between the fixed part and the attached portable part.

With more and more GSM/UMTS base stations being installed, the reluctance in the public against "electromagnetic pollution" is increasing. The electromagnetic pollution is often regarded as environmental pollution. Also, more and more cordless telephones such as telephone systems according to the DECT standard are criticized because their fixed stations are constantly transmitting the "dummy bearer" at a certain power level, repetition interval and transmitting frequency for the synchronisation of the portable parts to the fixed part.

Thus, it is an object of the present invention to provide for an environmentally friendly DECT telephone system.

The above object is solved by a telephone system operating in accordance with the DECT standard comprising a fixed part and a portable part, wherein the fixed part is connectable to a phone line and wherein the portable part is connectable to the fixed part by means of a wired connection for synchronisation between the fixed part and the portable part.

Therefore, according to the present invention, the synchronisation is not performed via the radio link, but via a wired connection. Advantageously, the power transmitted from the fixed part to the portable part for synchronisation is reduced significantly, such that the electromagnetic pollution is reduced.

According to an exemplary embodiment of the present invention as set forth in claim 2, there is provided a charging device which is connectable to the fixed part via the wired connection, such that when the portable part is connected to the charging device, the synchronisation between the fixed part and the portable part is made via the wired connection. Advantageously, this embodiment allows a very simple and user-friendly operation of the telephone system, since whenever the user puts the portable part onto the charging device, the synchronisation takes place via the wired connection. Hence, the transmission power transmitted via the radio link between the portable part and the fixed part is reduced significantly.

According to another exemplary embodiment of the present invention as set forth in claim 3, there is no radio communication between the fixed part and the portable part, when the portable part is connected to the fixed part via the wired connection except when there are fixed part driven events such as an incoming call. Advantageously, since the dummy barrier is no longer necessary, the transmission and thus the electromagnetic pollution is reduced to zero when the portable part is connected to the fixed part via the wired connection.

According to another exemplary embodiment of the present invention as set forth in claim 4, the wired connection is a class 2 synchronisation port, as set forth in the European Standard ETSI EN 300 175-2 V1.5.1 (2001-02) which advantageously allows for a very simple implementation of the synchronisation via the wired connection in the telephone system operating in accordance with the DECT standard.

According to an exemplary embodiment of the present invention as set forth in claim 5, a fixed part for a telephone system operating in accordance with the DECT standard is provided where the synchronisation between the fixed part and the portable part can be carried out via the wired connection, such that the electromagnetic pollution of the environment is significantly reduced.

According to an exemplary embodiment of the present invention as set forth in claim 6, advantageously, a very user-friendly design of the fixed part is provided, allowing for a "pollution free" synchronisation between the fixed part and the portable part, when the portable part is connected to the charging device.

According to an exemplary embodiments of the present invention as set forth in claims 7 and 8, a portable part for a telephone system operating in accordance with the DECT standard is provided, allowing for a user-friendly operation of the telephone system, while ensuring a reduced electromagnetic pollution of the environment.

Further embodiments of the present invention as set forth in claims 9 and 10 provide for a method of synchronizing a portable part and a fixed part of a DECT telephone system, allowing for a reduction of a transmission power between a portable part and a fixed part of a DECT telephone system and allowing for a simple operation of the telephone system.

Claim 11 relates to an exemplary embodiment of a computer program for a telephone system executing the method according to the present invention. Advantageously, this computer program allows for a reduction of an electromagnetic power transmission between the fixed part and the portable part of a DECT telephone system.

It is the gist of an exemplary embodiment of the present invention to carry out a synchronisation (i.e. the small corrections to the portable part timings after alignment has been achieved during the portable part synchronisation process as set forth in the DECT standard) between the portable part and the fixed part of a DECT telephone system via a wired connection between the portable part and the fixed part once the timing of the portable part is aligned to the fixed part. Preferably, according to an exemplary embodiment of the present invention, a class 2 synchronisation port may be used to maintain synchronisation between the fixed part and the portable part and to switch off the permanent transmission of the dummy bearer.

These and other aspects of the present invention will become apparent from and elucidated with reference to the embodiments described hereinafter.

Exemplary embodiments of the present invention will be described in the following, with respect to the following drawings.

Figure 1:
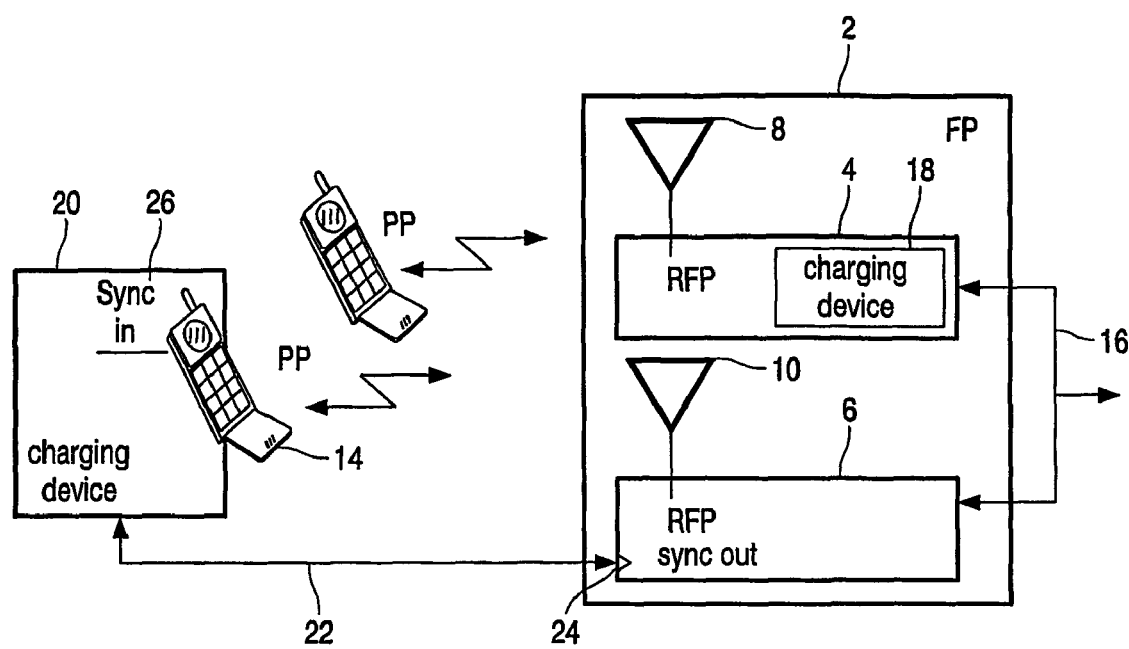
FIG. 1 shows an exemplary embodiment of an architecture of the DECT telephone system according to an exemplary embodiment of the present invention.

FIG. 1 shows a simplified schematic representation of an exemplary embodiment of a telephone system operating in accordance with the DECT standard according to the present invention. In FIG. 1, there is shown a fixed part FP 2 comprising a first radio fixed part RFP 4 and a second radio fixed part RFP 6. Each of the first and second radio fixed parts has an antenna 8 and 10 for transmitting and/or receiving radio signals from and to the portable parts PP 12 and 14. The details of the radio links between the first and the second radio fixed parts 4 and 6 and the portable parts 12 and 14 are set forth in the DECT standard.

Each of the first and second radio fixed parts 4 and 6 is connected via a telephone line 16 to a switched telephone network, such as an ISDN telephone network.

As shown in FIG. 1, the first radio fixed part 4 comprises a charging device 18. The charging device 18 is connected to the radio fixed part 4 via a wired connection. Thus, in case one of the portable parts 12 and 14 is put onto charging device 18 of the first radio fixed part 4, there is a wired connection between the first or second portable part 12 or 14 and the radio fixed part 4.

According to the present invention, when a portable part 12 or 14 is put onto the charging device 18 of the radio fixed part 4, a synchronisation between the radio fixed part 4 (i.e. the fixed part) and the portable part 12 or 14 is carried out via the wired connection between the charging device 18 and the radio fixed part 4, such that no radio communication between the radio fixed part 4 and the portable part 12 or 14 is necessary for synchronisation. Hence, once the portable part 12 or 14 is put onto the charging device 18, the transmission of a dummy barrier usually used for synchronisation between the portable parts 12 and 14 and the fixed part 2 may be suspended. Thus, a transmission power between the portable parts 12 and 14 and the fixed part 2 can be reduced significantly, such that the emission of electromagnetic energy is reduced significantly.

As shown in FIG. 1, the second radio fixed part 6 is connected to a charging device 20 via a wired connection 22. The charging device 20 is physically separated from the radio fixed part 6 and/or the fixed part 2 and may be located at a distance from the radio fixed part 6 and/or the fixed part 2. The wired connection 22 may simply be a cable between the fixed part and the radio fixed part 6 and the charging device 20. However, it is also possible to use an already existing wiring such as the electric lines in a house as the wired connection 22, between the charging device 20 and the fixed part 2 and/or the radio fixed part 6. In particular, if the electric lines are used as wired connection 22 between the fixed part 2 or the radio fixed part 6 and the charging device 20, no extra wiring is necessary, in order to establish the wired connection 22 between the charging device 20 and the radio fixed part 6 and/or the fixed part 2.

Preferably, the wired connection 22 carrying the reference synchronisation signal between the portable part 14 and the fixed part 2 extends between a synchronisation port "SYNC OUT" 24 at the radio fixed part 6 and an input port "SYNC IN" 26 at the portable part 14. Preferably, the synchronisation ports "SYNC IN" 26 and "SYNC OUT" 24 are conformed to the V 11 recommendations as set forth in the EIA TIA/EIA-422-B [8].

The portable part 14 monitors the SYNC IN 26 for a valid input synchronisation signal. If a valid synchronisation signal is detected at the SYNC IN 26, the portable part adjusts its timing by applying small corrections to its counters based on the synchronisation signal detected at the SYNC IN 26.

Figure 2:
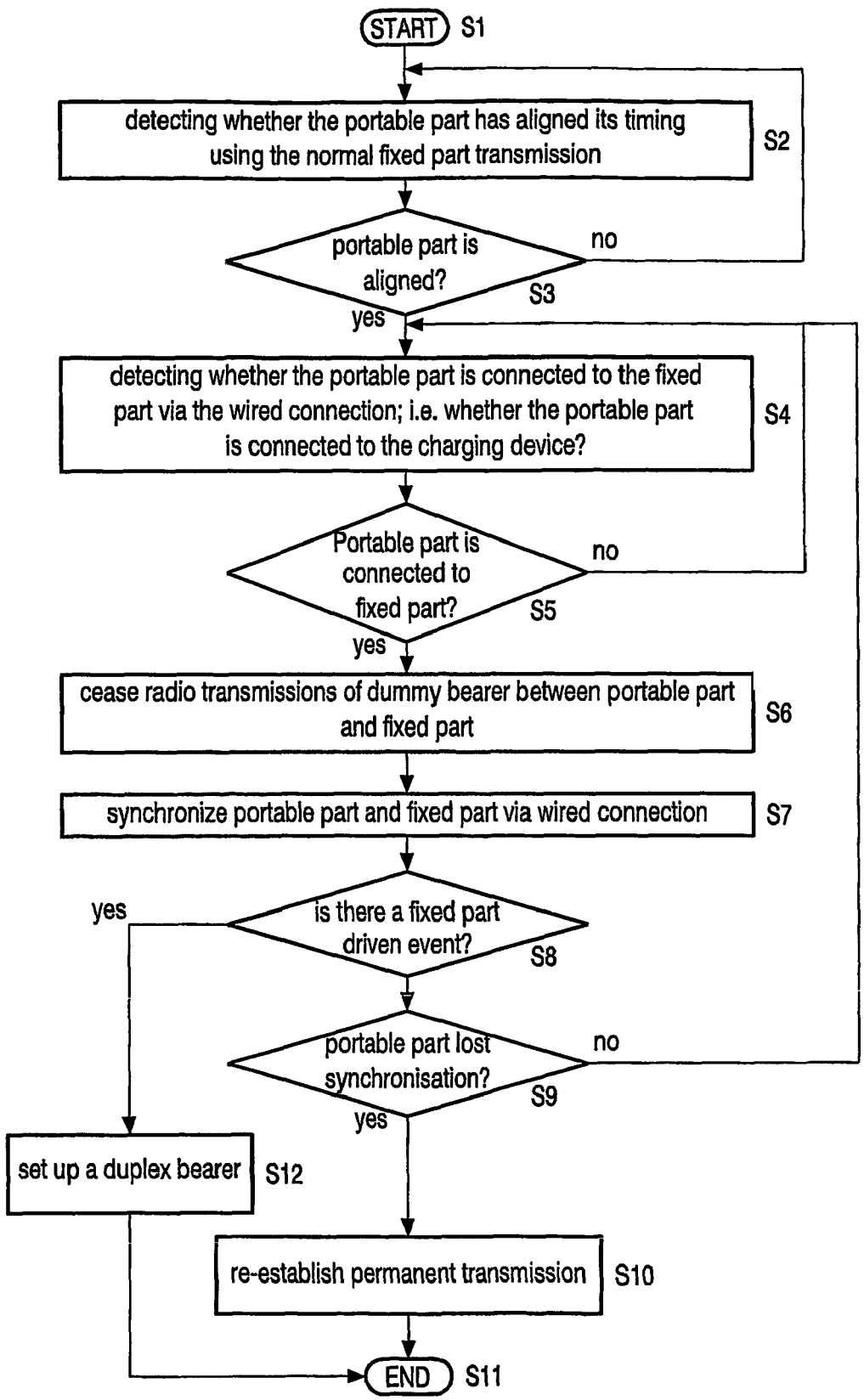
FIG. 2 shows an exemplary embodiment of a method of operating the telephone system of FIG. 1.

FIG. 2 shows an exemplary embodiment of a method of operating the telephone system of FIG. 1. In the following, the operation of the telephone system of FIG. 1 will be described with reference to the portable part 14, the charging device 20, the wired connection 22, the radio fixed part 6 and the fixed part 2.

After the start in S1, the method continues to step S2 where it is detected whether the portable part 14 has aligned its timing using the normal fixed part transmission as set forth according to the DECT standard. Then, the method continues to step S3, where a query is made whether the portable part 14 is aligned or not. In case it is determined in step S3 that the portable part is not aligned, the method returns to step S2.

In case it is determined in step S3 that the portable part 14 is aligned, the method continues to step S4, where it is determined whether the portable part 14 is connected to the fixed part 2 (i.e. to the radio fixed part 6) via the wired connection 22. In other words, in the telephone system depicted in FIG. 1, it is determined whether the portable part 14 is connected to the charging device 20 which is connected to the fixed part 2. Then, the method continues to step S5, where a query is made whether the portable part 14 is connected to the fixed part 2 or not. If it is determined in step S5 that the portable part 14 is not connected to the fixed part 2, the method returns to step S4. In case it is determined in step S5 that the portable part is connected to the fixed part, the method continues to step S6, where the radio transmission of the dummy bearer between the portable part 14 and the fixed part 2 (or the radio fixed part 6) is ceased. From here, there is no longer a dummy barrier for synchronisation between the fixed part 2 and the portable part 14. Accordingly, an electromagnetic pollution of the environment is reduced significantly.

After the radio link for synchronisation in the portable part 14 and the fixed part 2 has been shut off, the method continues to step S7, where the portable part 14 and the fixed part 2 are synchronized via the wired connection. Then, the method continues to step S8, where a query is made whether there is a fixed part driven event, such as an incoming call. If the query in step S8 yields that there is no fixed part driven event, the method continues to step S9, where a query is made whether the portable part 14 lost synchronisation. In case the query yields in step S9 that the portable part has not lost synchronisation, the method returns to step S4.

In case it is determined in step S9 that the portable part 14 lost synchronisation, the method continues to step S10, where the normal radio transmission as defined in the DECT standard is re-established between the portable part 14 and the fixed part 2 and/or the radio fixed part 6. After the permanent radio transmission has been re-established in step S10, the method ends in step S11.

In case it is determined in step S8 that there is a fixed part driven event such as an incoming call, the method continues to step S12, where a duplex radio barrier is set up between the portable part 14 and the radio fixed part 6, to, for example, establish the speech transmission between the radio fixed part 6 and the portable part 14, without having the dummy barrier re-established. In order to allow the set-up of the duplex barrier immediately without having the dummy barrier re-established, the portable part 14 has to obey the DECT channel selection rules, as set forth in the DECT standard, in order to be TBR6 compliant. Then, after the duplex barrier has been set up in step S12, the method ends in step S11.

Figure 3:
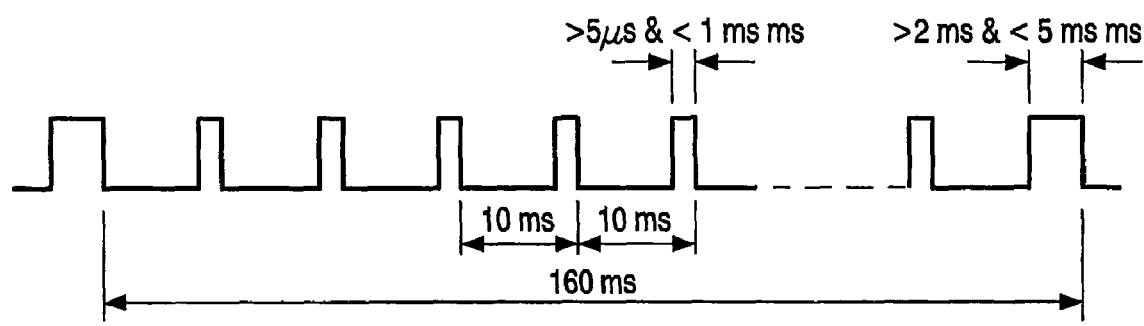
FIG. 3 shows an exemplary embodiment of a synchronisation signal timing according to the present invention, as may be used in the telephone system of FIG. 1.

FIG. 3 shows an exemplary embodiment of the synchronisation signal timing as transmitted by the wire connection 22, between the fixed part 2 and the charging device 20. The synchronisation signal sypo_p_corr illustrated in FIG. 3 is a 100 Hz signal having positive pulses of a width between 5 µs and 1 ms, except for frame 0 which occurs every $16^{th}$ pulse, which has a pulse width between 2 ms and 5 ms. The synchronisation signal sypo_p_corr illustrated in FIG. 3 is in accordance with ETSI EN 300 175-2 V1.5.1 (2001-02). This signal establishes the 10 ms DECT framed interval and the 160 ms DECT multiframe interval, as set forth in the DECT standards.

The synchronisation signal has a long-term frequency accuracy of better than ±5 ppm (nominal conditions) or ±10 ppm (extreme conditions).

As the waveform is asymmetric, devices such as the portable parts 12 and 14 may establish proper timing relations in the event that a pair of input signal wires is used and that the differential pair of input signal wires is (improperly) connected (pair inversion).

The random phase jitter on the falling edge of the synchronisation signal shall not exceed 0.5 µs rms. The differential amplitude shall be greater than 400 mV peak to peak.

The signal sypo_p_corr is used in the portable part pp to synchronize the system timing to the synchronization port. The length of the wide pulse differentiates between the following meanings:

2 . . . 3 ms: indicating the start of a multiframe.

4 . . . 5 ms: indicating the start of a multiframe and a new radio frequency scanning cycle (optional).

As described above, according to the present invention, the electromagnetic pollution created by cordless phones, for example the ones according to the DECT standard, is significantly reduced since the transmission of the so-called dummy barrier at a certain power level, repetition interval and transmission frequency between the portable part and the fixed part can be suspended. The initial synchronisation of the portable part PP to the fixed part FP timing is still done via air. Bit counters, slot counters, frame, multiframe and PSCN counters are already aligned when the dummy is switched off. The synchronisation signal sypo_p_corr allows to maintain this synchronisation.

Thus, according to the present invention, a standby mode is proposed according to which the DECT cordless telephone system is not radiating electromagnetic energy, but still can receive incoming calls and conduct outgoing calls without any time delay. Therefore, according to the present invention, the possibility of negative effects on human health, which may be caused by the electromagnetic energy, can be reduced and eventually can be totally excluded.

The invention claimed is:

1. A telephone system operating in accordance with the DECT standard, comprising:
   a fixed part and a portable part,
   wherein the fixed part is connected to a phone line, and the fixed part includes a charging device for charging the portable part,
   wherein the portable part performs synchronization with the fixed part by means of a wireless connection and is adapted to perform synchronization with the fixed part also by means of a wired connection; and
   wherein when the portable part is put onto the charging device, a wired connection is established between the fixed part and the portable part, then synchronization is performed by the wired connection instead of by the wireless connection.

2. The telephone system according of claim 1, wherein, when a wired connection is established between the fixed part and the portable part, there is no radio communication between the fixed part and the portable part.

3. The telephone system according to claim 1, wherein the synchronization between the portable part and the fixed part via the wired connection is carried out by using a class 2 synchronization port as set forth in the European Standard ETSI EN 300 175-2 V1.5.1 (2001-02).

4. The telephone system according to claim 1, further comprising a computer program being adapted to perform the following steps when executed in the telephone system: determining whether there is a wired connection between the portable part and the fixed part, synchronizing the portable part and the fixed part by means of a signal transmitted via the wired connection when there is a wired connection between the portable part and the fixed part.

5. The telephone system according to claim 1, wherein when the synchronization is performed by a wired connection, a synchronization signal is sent by the fixed part to the portable part, said signal has a frequency of about 100 Hz having positive pulses of a width between 5 micro second and one millisecond except from frame 0 which has a pulse width between 2 and 5 ms.

6. The telephone system according to claim 5, wherein the random phase jitter on the failing edge of the synchronization signal does not exceed 0.5 micro second and the differential amplitude is greater than 400 mV peak to peak.

7. The telephone system according to claim 6, wherein the width of the signal that is sent for synchronizing the portable part to the fixed part is adapted to differentiate between the following meanings:
   (a) a pulse between two and three ms indicates a start of a multi-frame;
   (b) a pulse between four and five ms indicates a start of a multi-frame and a new radio frequency scanning cycle.

8. A fixed part for a telephone system operating in accordance with the DECT standard, the telephone system comprising the fixed part and a portable part, wherein the fixed part is connected to a phone line, and the fixed part includes a charging device for charging the portable part;
   wherein the portable part performs synchronization with the fixed part by means of a wireless connection and is adapted to perform synchronization with the fixed part also by means of a wired connection, and
   wherein when the portable part is put onto the charging device a wired connection is established between the fixed part and the portable part, then synchronization is performed by the wired connection instead of by the wireless connection.

9. A portable part for a telephone system operating in accordance with the DECT standard, the telephone system comprising a fixed part and the portable part, wherein the fixed part is connected to a telephone line, and the fixed part includes a charging device for charging the portable part;

wherein the portable part performs synchronization with the fixed part by means of a wireless connection, and is adapted to perform synchronization with the fixed part also by means of a wired connection; and wherein when the portable part is put onto the charging device a wired connection is established between the fixed part and the portable part, then synchronization is performed by the wired connection instead of by the wireless connection.

10. A method of synchronizing a portable part and a fixed part of a DECT-telephone system, the method comprising the steps of:

determining whether there is a wired connection between the portable part and the fixed part, when the portable part is put onto the charging device, if there is a wired connection between the fixed part and the portable part the synchronization between the portable part and the fixed part is performed through the wired connection and radio link for wireless synchronization is suspended; if there is no wired connection between the fixed part and the portable part the synchronization between the portable part and the fixed part is performed through the wireless connection.

* * * * *